UNITED STATES PATENT OFFICE.

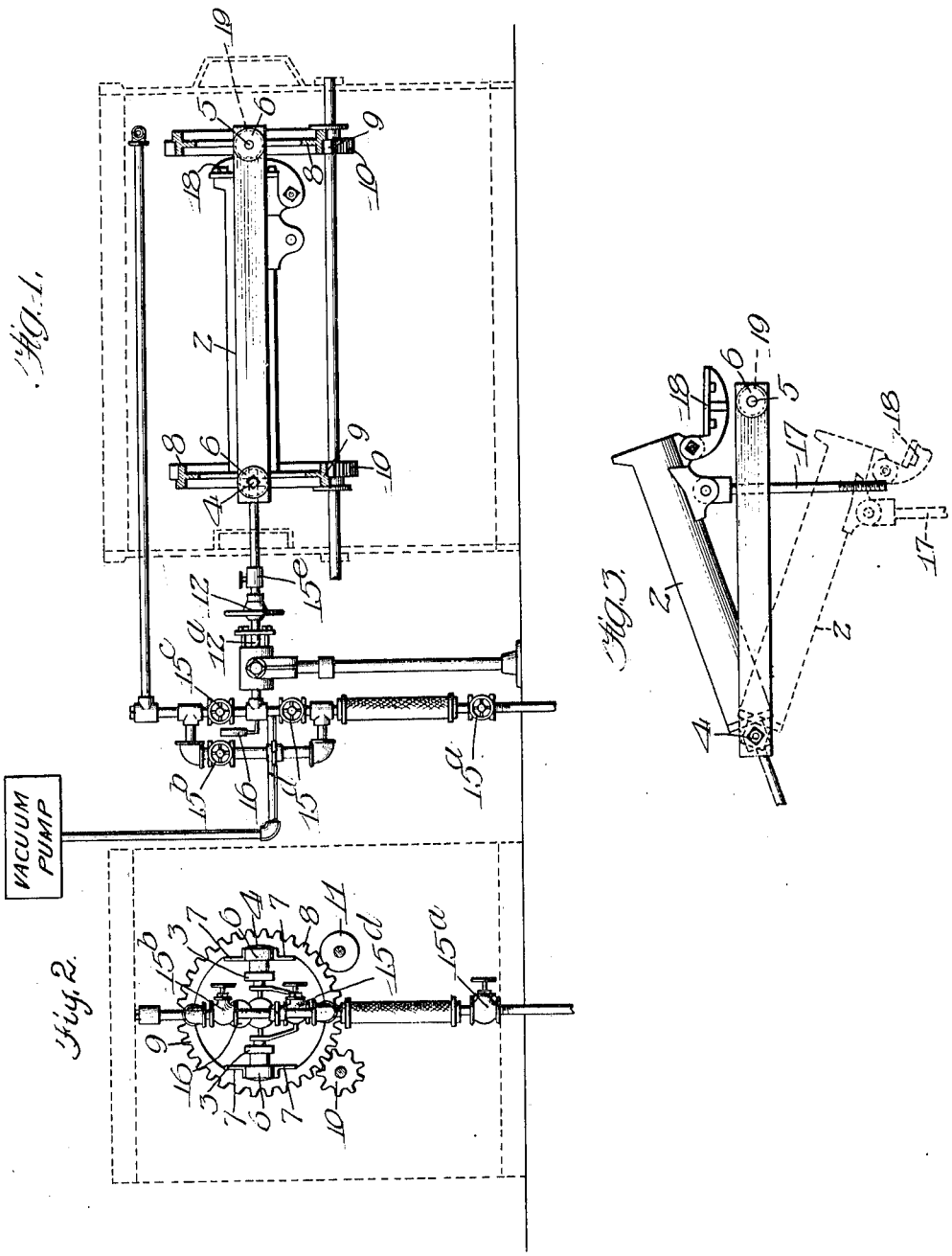

ALEXANDER P. ANDERSON, OF CHICAGO, ILLINOIS.

ART OF TREATING AND DRYING CEREAL GRAINS.

1,035,839.  Specification of Letters Patent. Patented Aug. 20, 1912.

Application filed April 24, 1907, Serial No. 370,005. Renewed February 8, 1912. Serial No. 676,441.

*To all whom it may concern:*

Be it known that I, ALEXANDER P. ANDERSON, a citizen of the United States, residing at Chicago, in the county of Cook and State of Illinois, have invented new and useful Improvements in the Art of Treating and Drying Cereal Grains, of which the following is a full, clear, concise, and exact description, reference being had to the accompanying drawing, forming a part of this specification.

My invention relates to an improvement in the art of treating and drying cereal grains of all kinds, either hulled or unhulled, or in a comminuted form,—as for example, pearl hominy, pearled barley, grits and the like.

The process comprises two steps, the first of which, broadly considered, consists in heating the moisture-saturated grains in an air-tight cylinder or drum until a pressure of about 10 to 50 pounds per square inch develops or until a temperature of about 110 to 150 degrees C., has been reached. During the heating process the grains are stirred or agitated by a continuous rotation of the cylinder.

The second step, which preferably follows the first step immediately, consists in subjecting the grains thus treated to the action of a vacuum pump until the grain is dried down to the desired dryness,—for example, to an air-dry condition.

One of the objects of my invention is to convert unhulled cereal grains into a cooked or semi-cooked condition, whereby they may be more readily hulled after such treatment, by rendering the grains resistant or glassy in their structure without breaking their cells or destroying the original form, size or identity, to any extent whatsoever. Grains thus treated when dried down to an air-dry condition may be stored for any length of time without danger of deterioration; or, if it be desired, they may be still further treated,—for example, flaked, ground, or cut into meal or grits. The grains may also be puffed, whereby they become greatly expanded without losing their original shape; in other words, swelled grain is substantially homologous to the natural grain. One method of puffing grain thus treated I have described in my co-pending application, Serial Number 370,004 filed April 24, 1907.

The grains, especially rice, when thus treated become resistant to the rapid escape of their contained moisture. Hence, when in their air-dry condition, they can be puffed and increased many times the size of their original form by rapidly heating them in any suitable manner,—as, parching them in hot fat or oil, or in a corn-popper inside of a hot oven. The grains thus parched do not lose their identity by becoming everted; nor are they otherwise broken up when swelled.

In the accompanying drawings I show one form of apparatus suitable for carrying out the herein described process.

Figure 1 is a side view of the piping together with a longitudinal sectional elevation of the drum-support in the oven, the latter being indicated in dotted lines. Fig. 2 is a rear end view of the arrangement shown in Fig. 1 and Fig. 3 shows the drum in charging and discharging positions, the latter position being indicated in dotted lines.

The material to be treated is put into a drum 2, mounted upon a suitable car capable of being rolled about and brought to the various parts of the apparatus for handling. The car consists of two side members 3, 3, having a trunnion 4 extending therebetween at the rear end; a shaft or axle 5 connects the forward ends of said members. Small wheels or rollers 6 are mounted outside of the members 3, upon the projecting ends of trunnion 4 and shaft 5. The cars run on a track 7 within the oven consisting of four rails fastened to the inside of the cage 8. At each end of the oven is a ring 9 having teeth outside forming a gear, which meshes with another gear 10 adapted to rotate the cage. The gears 10 and rollers 11 support the cage and inclosed drum, in addition to turning it by any suitable power applied to one of their supporting shafts outside of the oven.

By means of the gears 9 and 10 the cage containing the drum is rotated slowly during the heating. Rotation is permitted by the stuffing box $12^a$ which at the same time maintains the steam-connection. The arrangement of the piping shown is as follows; $15^a$, $15^b$, $15^c$, $15^d$ and $15^e$ are valves; 16 is a pressure gage. By opening valves $15^b$ and $15^a$, and closing valves $15^d$ and $15^c$, the steam is by-passed around the drum. By closing valve $15^b$ and opening $15^c$, the pressure in the drum may be brought to any desired point as shown by gage 16. To reduce the pressure in the drum, valve 15ᶜ may be closed, and valves 15ᵈ and 15ᵃ opened whereby the pressure escapes into the atmosphere. Thus, by proper valve-manipulation the conditions of pressure and temperature in the drum may be regulated and controlled absolutely within the desired limits. It will be understood that the oven is heated by any suitable or desired means,—as, for example, by gas.

The lid 18 of the drum is clamped tightly closed, a suitable soft-metal gasket being provided to cause an air-tight connection, when the drum is in the horizontal position in the frame. In order that the heating may not unseal the lid, I prefer to make the drum of bronze, or some material having a higher coefficient of expansion than the side members of the frame.

After the treatment has been brought to a close, the drum is disconnected at 12, and run out of the furnace to the discharging mechanism, which, by means of an arm 17 suitably connected therewith, lowers the drum about 4 as a pivot. The lid 18, previously held shut by the roller 19, may now be opened, and the contents discharged. In charging, the drum is raised by the same arm or screw 17 until it tilts upwardly, when the material to be treated may be fed into the drum.

I take hulled rice or paddy rice and add to it a sufficient quantity of moisture, preferably by soaking the grain in cold water until it becomes saturated. When thus saturated, and when all of the excess water has been well drained off, the rice contains from 25 to 40% of total moisture. Due to the water imbibed the moisture saturated grains have slightly enlarged, but otherwise they are unchanged in their form and structure, and have not been broken up. A quantity of the rice thus prepared is put into the cylinder sufficient to fill it from one-third to two-thirds whereupon the cylinder is sealed air-tight and placed inside the oven where it is kept at a temperature of about 170 degrees C. Or, the cylinder may be steam-jacketed, and steam at a pressure of about 60 pounds per square inch may be used for applying the heat. In either case the rice under treatment is not in contact with the steam in the jacket or with the oven flame, but is kept away from the steam, flame and fumes by being inclosed in the air-tight cylinder, receiving only the heat that is radiated from the cylinder wall or the inner plate of the steam jacket.

The cylinder is rotated while heating so that the rice grains will be kept stirring and tumbling, whereby all the grains receive the same amount of heat from the cylinder-wall.

As soon as the rice under treatment reaches about 70 degrees C., the moisture of the grain begins to act on the starch granules by hydrating them. Such hydrating action increases with the increasing temperature.

When the temperature of the rice reaches 100 degrees C., steam begins to form and soon thereafter pressure develops. The treatment is continued until a pressure of about 10 to 55 pounds per square inch has formed, or until the temperature of the rice has reached 110 to 150 degrees C.

During the treatment the grains have not changed their shape, but are found at the end of the treatment in substantially the same condition as when put into the cylinder. Due to the softening of the starch granules by hydration, the whole rice grain has become somewhat softened, and in texture the whole grain is rubbery when pressed between the fingers. The surfaces of the grains are not broken, nor are the grains distorted in any way or pasted together as is the case when rice is boiled or steamed by the old methods. The reason for this is evident: During the treatment only enough moisture was present in the grains to hydrate the starch granules *in situ* and not enough to macerate the grains, as is the case when an excess of water is added to the rice, or when the rice is boiled or subjected to direct steaming. In these events the surfaces of the grains become sticky and broken. By my new process, as herein described, the surface is left in its natural smooth, unbroken condition.

The rice, treated as above set forth, contains practically the same percentage of moisture as it did when put into the cylinder for treatment,—a small percentage of the moisture having been lost by conversion into steam confined in the space unoccupied by the rice.

The rice is now ready for the second stage of the operation, which consists in reducing the pressure of the cylinder below that of the atmosphere. This is done by opening the valve which connects the cylinder with the vacuum pump, thus allowing the pressure of the cylinder first to blow off to normal atmospheric pressure and then creating within the cylinder a vacuum or partial vacuum by starting the vacuum pump. For the sake of simplicity and clearness I have indicated the connections between the drum and the vacuum pump merely in a diagrammatic way (see Fig. 1), inasmuch as it lies within the skill of anyone versed in the art to connect the drum or cylinder with any form of suitable vacuum pump. The vacuum gage is maintained at about 27 inches of mercury until the rice has dried out to the desired percentage. Thus, if the rice contained at the beginning of the operation something like 35 per cent of moisture, and it is desired to dry it down to 10 per cent, then 25 per cent would be drawn off. This is readily determined by measuring or weighing the drawn-off water. In the event that it is not desired to stop the operation at a certain moisture percentage, it is not necessary to condense and weigh the moisture drawn off by means of the vacuum pump. In such a case the steam drawn off may be allowed to escape, and the operation stopped as soon as the rice is about air-dry. The length of time required to dry the grain is readily determined by practice.

When the desired percentage of moisture has been reached, the operation is stopped and the dry grain taken out of the cylinder for storage or for further treatment, as above described.

Instead of rice, I may take oats either hulled or unhulled, and saturate the grains with water, as by soaking in water and then draining off the water not imbibed by the grains. This leaves the grain moisture-saturated, in which condition they contain about 35 per cent of total moisture. Enough of the oats thus treated is put into the cylinder to fill it about one half. The cylinder is then sealed and run into the oven which is kept at about 170 degrees C. Rotation of the cylinder is now begun and the heating continued until a pressure of about 25 pounds per square inch develops within the cylinder. This pressure is now reduced slowly by blowing off either through the condenser of the vacuum pump or through the air. The valve of the vacuum pump attached to the cylinder-connections is now opened and the pressure inside of the cylinder brought to a partial vacuum, say to 27 inches of mercury, at which point it is kept until the oats contains about 10 to 15 per cent moisture. The operation is then completed by stopping and opening the cylinder and taking out the oats. Unhulled oats, treated and dried as above described, hull readily by the usual oat-hulling machinery and methods of hulling this kind of grain.

Having thus described my invention, what I claim as new and desire to secure by Letters Patent of the United States, is:

1. The process of treating cereal grains which consists in tumbling the approximately moisture-saturated grain in an air-tight, heated receptacle until steam is formed from the moisture in the grain whereby a pressure develops within the receptacle, and then reducing the pressure to dry the grain down to the desired degree of moisture.

2. The process of treating cereal grains which consists in tumbling the approximately moisture-saturated grain in an air-tight, heated receptacle until steam is formed from the moisture in the grain whereby a pressure develops within the receptacle, and then reducing the pressure below atmospheric to expel any desired percentage of moisture.

3. The process of treating cereal grains which consists in tumbling the approximately moisture-saturated grain in an air-tight, heated receptacle until steam is formed from the moisture in the grain, then continuing the heating and tumbling until a pressure of from 10 to 55 pounds per square inch has developed within the receptacle, and then reducing the pressure to dry the grain down to the desired degree of moisture.

4. The process of treating cereal grains which consists in tumbling the approximately moisture-saturated grain in an air-tight, externally heated receptacle until steam is formed from the moisture in the grain, then continuing the heating and tumbling until a pressure of from 10 to 55 pounds per square inch has developed within the receptacle and the grain becomes hydrated, and then reducing the pressure below atmospheric to expel any desired percentage of moisture.

5. The process of treating cereal grains which consists in saturating the grain with moisture, heating the grain in a closed receptacle until steam is developed from the moisture in the grain, continuing the heating to develop pressure, while stirring and tumbling the grain, and then relieving the pressure in the receptacle and creating a vacuum therein to dry the product.

In witness whereof, I have hereunto subscribed my name in the presence of two witnesses.

ALEXANDER P. ANDERSON.

Witnesses:
A. A. THOMAS,
C. L. HOPKINS.